United States Patent
Rakshit

(10) Patent No.: US 10,228,842 B2
(45) Date of Patent: Mar. 12, 2019

(54) PROVISION OF EXTENDED CONTENT ON A FLEXIBLE DISPLAY

(71) Applicant: INTERNATIONAL BUSINESS MACHINES CORPORATION, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/797,817

(22) Filed: Oct. 30, 2017

(65) Prior Publication Data
US 2018/0052579 A1 Feb. 22, 2018

Related U.S. Application Data

(63) Continuation of application No. 14/797,241, filed on Jul. 13, 2015, now Pat. No. 9,880,729.

(51) Int. Cl.
*G06F 3/0488* (2013.01)
*G06F 3/14* (2006.01)
(Continued)

(52) U.S. Cl.
CPC .......... *G06F 3/0488* (2013.01); *G06F 1/1652* (2013.01); *G06F 3/14* (2013.01); *G09G 3/00* (2013.01); *G06F 2203/04803* (2013.01); *G09G 5/00* (2013.01); *G09G 2340/0407* (2013.01); *G09G 2340/0464* (2013.01); *G09G 2340/14* (2013.01); *G09G 2380/02* (2013.01)

(58) Field of Classification Search
CPC ........ G06F 3/0488; G06F 3/14; G06F 1/1652; G09G 3/00; G09G 5/00
See application file for complete search history.

(56) References Cited

U.S. PATENT DOCUMENTS

| | | | |
|---|---|---|---|
| 3,890,668 A | 6/1975 | Stosberg et al. | |
| 7,280,172 B2 | 10/2007 | Lee et al. | |

(Continued)

OTHER PUBLICATIONS

P., Daniel, "Samsung Flexible Display Patents Include Pull-Out and Rollable Concept Units", Mar. 7, 2012, 4 pages, http://www.phonearena.com/news/Samsung-flexible-display-patents-include-pull-out-and-rollable-concept-units_id27765.

(Continued)

*Primary Examiner* — Shaheda Abdin
(74) *Attorney, Agent, or Firm* — Michael O'Keefe; Matthew M. Hulihan; Heslin Rothenberg Farley & Mesiti PC

(57) ABSTRACT

Facilities are provided herein for invoking and providing an extended display on a flexible display of a computer system. Flexion being applied to a flexible display of a computer system is detected, the flexible display displaying primary content thereon, and the flexion including a bend in the flexible display along a bend line defining first and second regions of the flexible display. It is determined whether the detected flexion satisfies a threshold level of flexion for providing an extended display on the flexible display. If so, an extended display is provided on the flexible display, in which at least some of the primary content is displayed on the first region of the flexible display extended content is displayed on the second region of the flexible display.

20 Claims, 10 Drawing Sheets

(51) Int. Cl.
*G06F 1/16* (2006.01)
*G09G 3/00* (2006.01)
*G09G 5/00* (2006.01)

(56) References Cited

U.S. PATENT DOCUMENTS

| | | | |
|---|---|---|---|
| 8,072,481 B1 | 12/2011 | McNelley et al. | |
| 8,319,819 B2 | 11/2012 | MacDonald et al. | |
| 8,390,668 B2 | 3/2013 | Ferren et al. | |
| 2010/0120470 A1* | 5/2010 | Kim | G06F 1/1615 455/566 |
| 2014/0015743 A1* | 1/2014 | Seo | G06F 1/1694 345/156 |
| 2014/0028596 A1 | 1/2014 | Seo et al. | |
| 2014/0049464 A1* | 2/2014 | Kwak | G06F 3/0487 345/156 |
| 2014/0078046 A1* | 3/2014 | Seo | G06F 1/1652 345/156 |
| 2014/0098183 A1 | 4/2014 | Smith et al. | |
| 2014/0184489 A1 | 7/2014 | Ma et al. | |
| 2014/0211309 A1 | 7/2014 | Li et al. | |

OTHER PUBLICATIONS

Thrystan, "Samsung One Flexible Display Phone is Pulled Out of a Pen", Aug. 12, 2012, 5 pages, http://www.concept-phones.com/samsung/samsung-flexible-display-phone-pulled-pen/.

"Reflection and the Ray Model of Light—Lesson 2—Image Formation in Plane Mirrors", The Physics Classroom, http://www.physicsclassroom.com/class/refln/Lesson-2/Right-Angle-Mirrors.

Konchem Touchlo Vunte Chepta, Episode 11, Dec. 13, 2014, https://www.youtube.com/watch?v=Wwu2Tm4Tdzl.

"Perpendicular Mirrors", YouTube.com, https://www.youtube.com/watch?v=n4V3vT87L3w.

"Technology . . . or magic? Samsung shows off video of transparent, flexible screen—with 3D so real it looks like you can touch it", DailyMail.com, Dec. 7, 2011, 20 pages, http://www.dailymail.co.uk/sciencetech/article-2070741/Samsungs-transparent-flexible-screen-3D-real-looks-like-touch-it.html.

"Rollable Display", Wikipedia.org, 3 pages, http://en.wikipedia.org/wiki/Rollable_display.

"CES: Plastic Logic shows off Papertab, a tablet as thin and flexible as paper", theinquirer.net, Jan. 8, 2013, 5 pages, http://www.theinquirer.net/inquirer/news/2234602/ces-plastic-logic-shows-off-papertab-a-tablet-as-thin-and-flexible-as-paper.

List of IBM Patents or Patent Applications Treated as Related, Oct. 30, 2017, pp. 1-2.

Office Action in U.S. Appl. No. 14/954,287, dated Apr. 15, 2016, 2016, pp. 1-13.

Notice of Allowance in U.S. Appl. No. 14/954,287, filed Dec. 21, 2016, pp. 1-12.

Office Action in U.S. Appl. No. 14/797,241, dated Mar. 29, 2017, 2016, pp. 1-31.

Notice of Allowance in U.S. Appl. No. 14/797,241, dated Sep. 21, 2017, pp. 1-18.

Corrected Notice of Allowability in U.S. Appl. No. 14/797,241, dated Oct. 11, 2017, pp. 1-17.

* cited by examiner

PROVISION OF EXTENDED CONTENT ON A FLEXIBLE DISPLAY

BACKGROUND

The display-size, or screen-size, of a computer system affects the usability of the device and overall user-experience. A larger display size is beneficial when performing tasks like navigating photographs, reading documents or digital books, or working with multiple open windows. The major tradeoffs of a larger screen are the increase in power consumption and bulkiness of the device. The physical size of the display is generally a fixed property of the computer system absent an altogether replacement of the display with a larger one. However, recent hardware developments have produced flexible displays that can roll, bend, or fold. Such flexible displays may be made of "electronic paper" or a thin, flexible plastic substrate incorporating organic light emitting diode (OLED) technology, as examples. Flexible displays may roll and/or pull-out from the device, allowing a user to control the physical dimension of the display as desired. Thus, flexible displays can provide for a dynamic physical display size. Even with the ability to adjust the physical dimension of a flexible display, the upper limit of the display dimension is constrained by the overall dimension of the flexible display.

SUMMARY

Shortcomings of the prior art are overcome and additional advantages are provided through the provision of a method that includes detecting flexion being applied to a flexible display of a computer system. The flexible display displays primary content thereon, and the flexion includes a bend in the flexible display along a bend line defining first and second regions of the flexible display. The method determines whether the detected flexion satisfies a threshold level of flexion for providing an extended display on the flexible display. Based on determining that the detected flexion satisfies the threshold level of flexion, the method provides the extended display on the flexible display. Providing the extended display includes displaying at least some of the primary content on the first region of the flexible display and displaying extended content on the second region of the flexible display, the extended display having a virtual length presenting a depth-of-field dimension of the extended content.

Further, a computer program product including a computer readable storage medium readable by a processor and storing instructions for execution by the processor is provided for performing a method that includes: detecting flexion being applied to a flexible display of a computer system. The flexible display displays primary content thereon, and the flexion includes a bend in the flexible display along a bend line defining first and second regions of the flexible display. The method determines whether the detected flexion satisfies a threshold level of flexion for providing an extended display on the flexible display. Based on determining that the detected flexion satisfies the threshold level of flexion, the method provides the extended display on the flexible display. Providing the extended display includes displaying at least some of the primary content on the first region of the flexible display and displaying extended content on the second region of the flexible display, the extended display having a virtual length presenting a depth-of-field dimension of the extended content.

Yet further, a computer system is provided that includes a memory and a processor in communications with the memory, wherein the computer system is configured to perform a method including: detecting flexion being applied to a flexible display of a computer system. The flexible display displays primary content thereon, and the flexion includes a bend in the flexible display along a bend line defining first and second regions of the flexible display. The method determines whether the detected flexion satisfies a threshold level of flexion for providing an extended display on the flexible display. Based on determining that the detected flexion satisfies the threshold level of flexion, the method provides the extended display on the flexible display. Providing the extended display includes displaying at least some of the primary content on the first region of the flexible display and displaying extended content on the second region of the flexible display, the extended display having a virtual length presenting a depth-of-field dimension of the extended content.

Additional features and advantages are realized through the concepts described herein.

BRIEF DESCRIPTION OF THE DRAWINGS

Aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
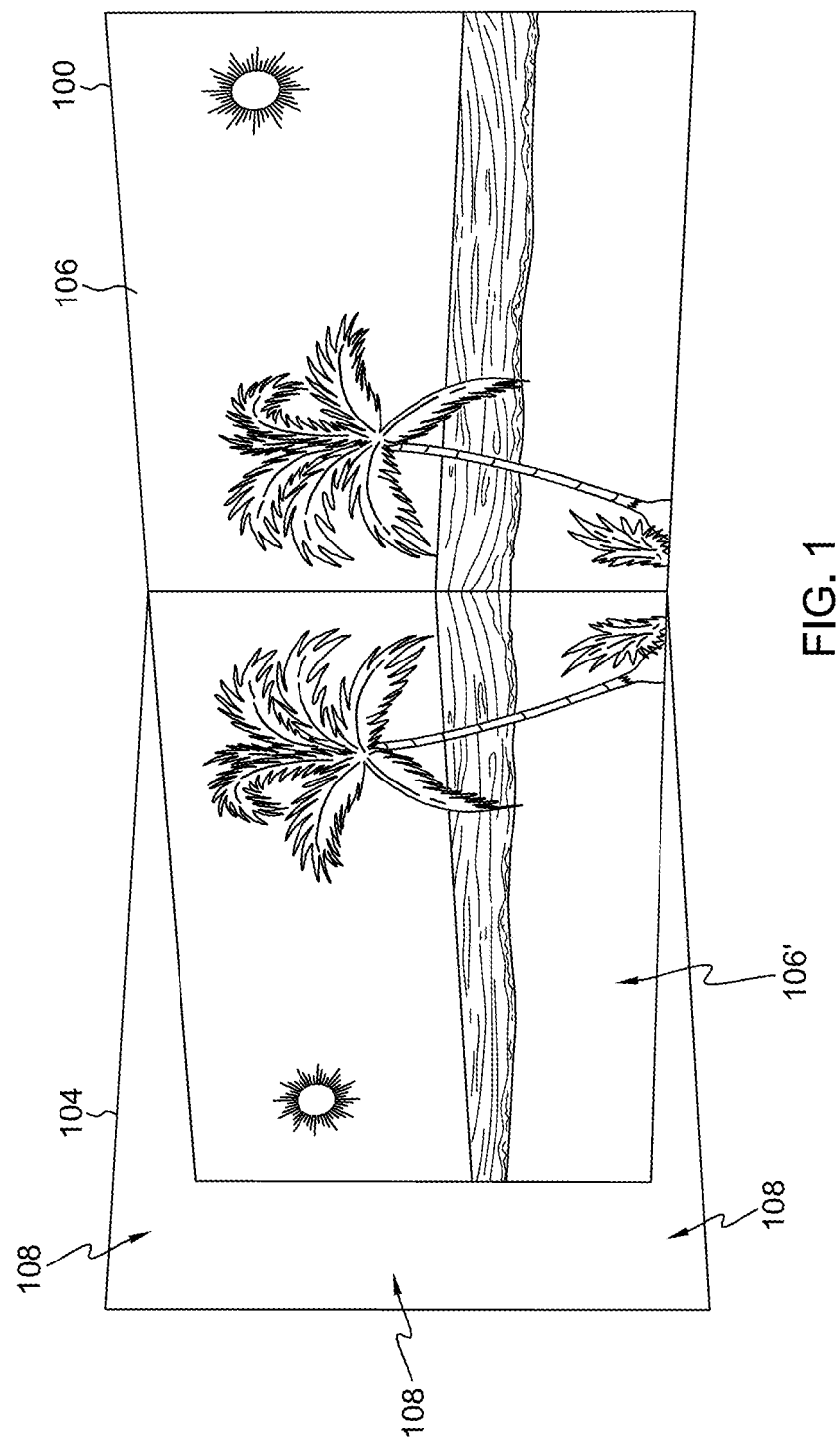
FIG. 1 illustrates a photograph adjacent a mirror presenting a reflection of the photograph and additional background content.

Aspects described herein provide enhancements in the effective display dimension of flexible displays, enabling a user to view extended content in a seemingly larger display space. This is provided in part by leveraging concepts of mirror imaging and linear scaling showing that depth mathematically increases the amount of information that can be shown visually on the display. An extended display is invoked based on flexion being applied to the flexible display. Content nearest the flex points may be presented with proper or minimal scaling, while content further from the flex points may be scaled more aggressively in order to impart a depth-of-field component to the presentation of the content on the flexible display. By scaling the content in this manner, additional display space is provided for presentation of additional information to the user.

In particular embodiments, a user may flex (bend) a portion of a flexible display of a computer system. The applied flexion may be compared to a predefined bend line location and bend angle, referred to herein as a threshold level or pattern of flexion. The predefinition may be made, in some embodiments, by a user of the system. When the flexion being applied satisfies the threshold, an extended display may be triggered. When the extended display is triggered, the flexible display dynamically adjusts to exhibit primary content and extended content regions. The primary content region presents primary content, which may include some/all content that was being displayed prior to triggering the extended region. The extended content region presents extended content. In some embodiments, at least some of the extended content is scaled to present a skew similar to a reflection of an object in a mirror (described below and depicted with reference to FIG. 1). Scaling of content in this manner may be implemented by software when computing/sending pixel data for the extended content for display on the extended region of the display. The user can view content displayed on both regions of the screen and can perform any available actions, touch or otherwise, on displayed extended content, including tagging, scrolling, sharing, etc.

The particular type of extended content and the required level of flexion needed to invoke display of the extended content can vary depending on the particular content or content type initially displayed (prior to flexing the display). In some embodiments, these are specified in a separate setting or preference of the content or metadata thereof, in an application to display the content, or in the computer system itself. One example of a specifiable setting is the location of the bend line required to invoke the extended display. Such a recommendation may travel with the content. For instance, a picture posted to a social media account may include an indication of the bend line location to invoke displaying extended content associated with the picture. More generally, guidance may be provided to a user once the user opens the content on the computer system. As an example, a recommended bending line location may be displayed informing the user of the location and optionally the amount of bend needed to invoke display of the extended content.

A user may also be able to configure global settings directed to the type of content displayed in the extended region. A user may desire that additional content about the primary content be displayed in the extended region, for instance social network posts, comments, feedback, or metadata information about the content. Another user my desire that continuity of the content be displayed in the extended region. Some examples of continuity include a next page when reading a digital book, a next forum page when viewing a web forum, or a next photograph in a photographic album, though many other examples exist.

To help illustrate a principle of mirror reflection, FIG. 1 depicts a photograph adjacent a mirror presenting a reflection of the photograph and additional background content. In FIG. 1, a device display 100 shows an image 106 of a beach scene. A mirror 104 of the same physical size as display 100 is placed end-to-end with display 100 at an angle such that the two are not coplanar (the interior angle is less than 180°). The reflection presented in the mirror 104 includes mirror image 106' of the beach scene with the entirety of the beach scene content being viewable in the mirror. Because of the angle between display 100 and mirror 104, the reflected image 106' of the beach scene appears skewed to reflect a depth to the virtual image being presented in the mirror. Consequently, the reflection presented includes an additional area 108 that would show a reflection of whatever appears behind display 100 in real space. The reflection introduces a depth element that is separate from any depth-of-field presented in image 106 itself (for instance the distance between the tree and the ocean in image 106). The skew in the reflection appears because of scaling that occurs to the features being reflected. Features nearest the interface of the adjacent edges of display 100 and mirror 104 are presented in truer scale than features farther from that interface, creating depth to the reflection. The result is that image 106' consumes only a part of the mirror's overall physical display area, providing additional space 108 for other content to be reflected.

Aspects described herein leverage this principle to present extended content in a scaled manner. This frees-up space for additional content to be displayed on the screen, increasing the perceived size of the flexible display. Though a mirror image 106' is used in FIG. 1 to illustrate this property, the actual extended content being displayed on the extended content region of a flexible display in accordance with aspects described herein may or may not be a mirror image of the primary content on the primary content region. In many examples, the extended content will not be a mirror image of the primary content, but will instead be different/supplemental content.

Figure 2A:
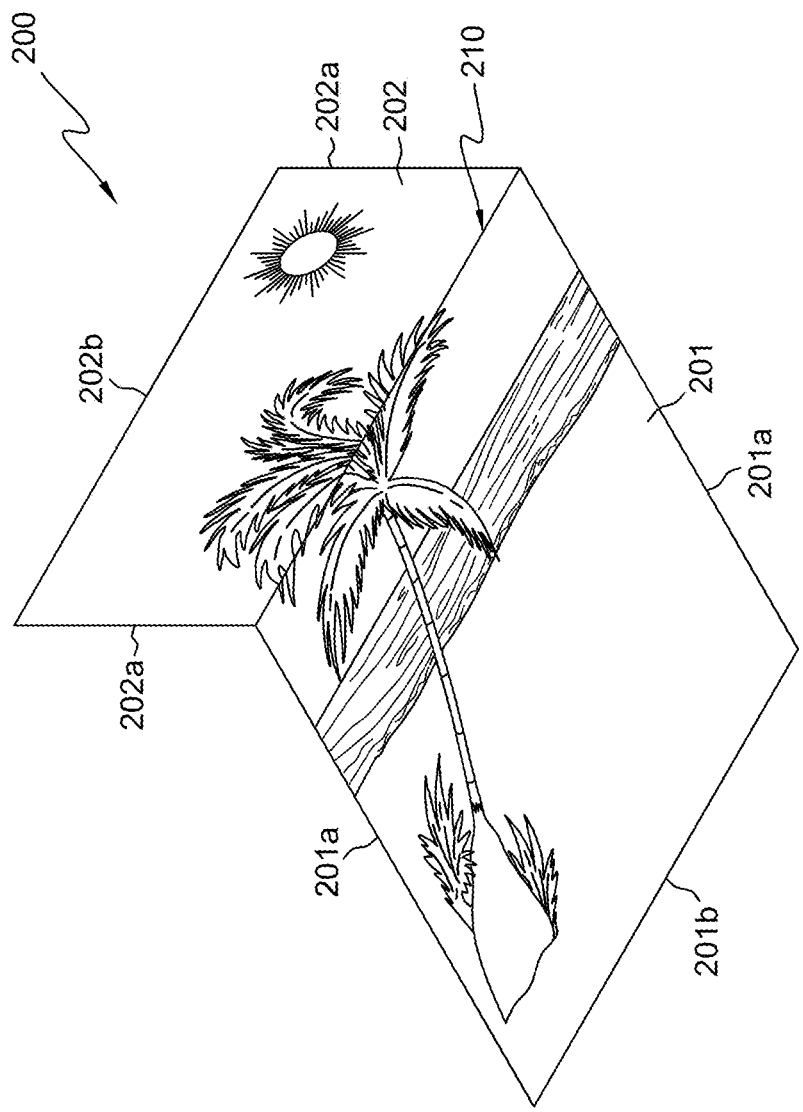
FIG. 2A depicts an example of flexion being applied to a flexible display to define multiple regions of the flexible display.

FIG. 2A depicts an example of flexion being applied to a flexible display to define multiple regions of the flexible display. Flexion is applied to flexible display 200 to bend the screen along bend line 210, defining first display region 201 and second display region 202. The portion of the beach scene presented in region 202 has not been scaled in this example, and therefore does not introduce a depth component as described above. It instead appears exactly like a physical photograph would appear if the top portion of the photograph were partially folded upward.

The length of the first display region 201 is 201a and length of bent portion/second display region 202 is 202a. Total screen length is therefore 201a +202a with, in this example, 202a being depicted shorter than 201a. The width 201b of region 201 is the same as the width of region 202.

Figure 2B:
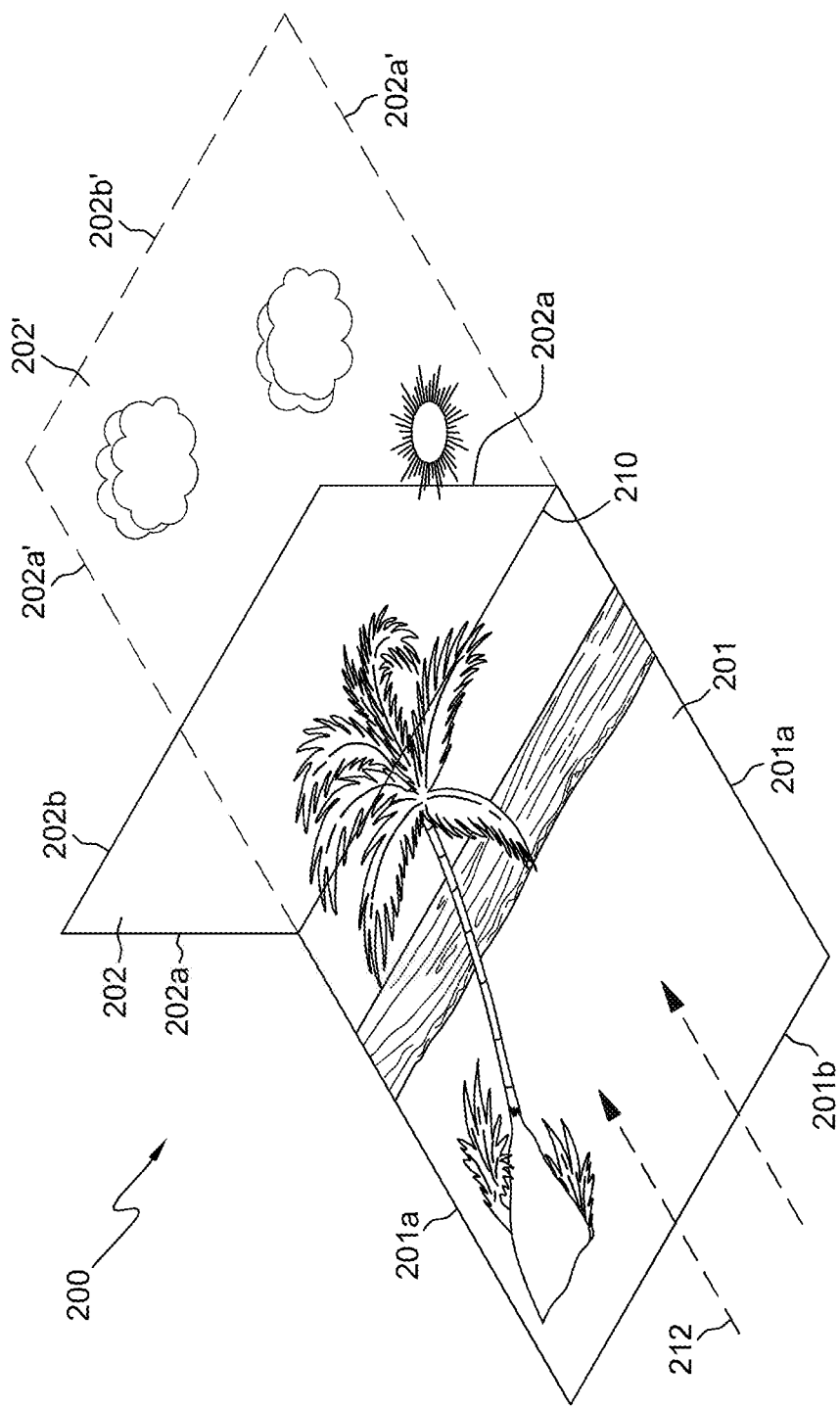
FIG. 2B depicts an example of flexion being applied to a flexible display, in which extended content presented in an extended content region of the flexible display is scaled to present a depth dimension, in accordance with aspects described herein.

FIG. 2B depicts an example of flexion being applied to a flexible display, in which extended content presented in an extended content region of the flexible display is scaled to present a depth dimension, in accordance with aspects described herein. FIG. 2B illustrates how scaling of the content on the extended content region can present the extended content on a virtual plan. In this examples, scaling has been applied to the portion of the image being displayed on second (extended) content region 202 based on a user's line of sight 212. 202' in FIG. 2B illustrates the virtual plane in which the content depicted in region 202 appears to reside. From the user's perspective, the features in the top portion of the beach scene, i.e. the top of the tree, the sun, and clouds will be scaled more aggressively the farther away they are from bend line 210. The scaling will introduce a depth dimension to the top portion of the image on region 202. As a result, additional virtual space is provided to fit additional content, in this case two clouds of the image that were not visible in FIG. 2A. The area of the virtual plane depicted is represented by 202a'×202b', and is greater than the physical area of the extended content region (i.e. 202a× 202b). Physical display size has not increased—it remains (201a+202a)—but the effective display length becomes (201a+202a').

By way of specific example, assume display 200 measures 10 cm vertically and that the user folds the screen at 3 cm from the top edge (202b) of the screen so that primary content region 201 is 7 cm vertically (201a). Based on the user's viewing angle 212 and scaling applied to the content on extended content region 202, the perceived virtual length (202a') of the extended display appears to be 7 cm, instead of the actual 3 cm (202a). In this manner, the presentation of the extended content in extended content region 202 by way of constructing the pixels thereof creates a 7 cm virtual length to the extended display.

In the example of FIG. 2B, the extended content region 202 is folded to 90° relative to primary content region 201 and the viewing angle 212 is near-orthogonal to extended content region 202. The scaling applied to the extended content may present the extended content as if virtual plane 202' is substantially coplanar with plane 201. However, aspects described herein may apply to any desired bend angle, larger or smaller than 90°, any desired viewing angle, and any possible angle for virtual plane 202' with respect to plane 201.

The bend line 210 in this example is substantially parallel to upper and lower edges 202b, 20ab of the display, though in other examples, the bend line may be diagonal with respect to those edges.

Scaled content may look different at different viewing angles. The device, when building the pixel data for presentation of the pixel content on the display, may take into account viewing angle of the user. More specifically, the skew presented by the scaling of the extended content can be tailored to the particular viewing angle of the user using the device so that the desired is effect is presented relative to that user's perspective. Additionally, the user can interact with any active elements displayed in the extended content region by touching the extended content region 202. In some embodiments, the user's viewing angle is detected, based on detecting location of the user's eyes for instance, and software installed on the computer device uses this in conjunction with the user's touch-input to find the effective touch point in the extended area.

Figure 3:
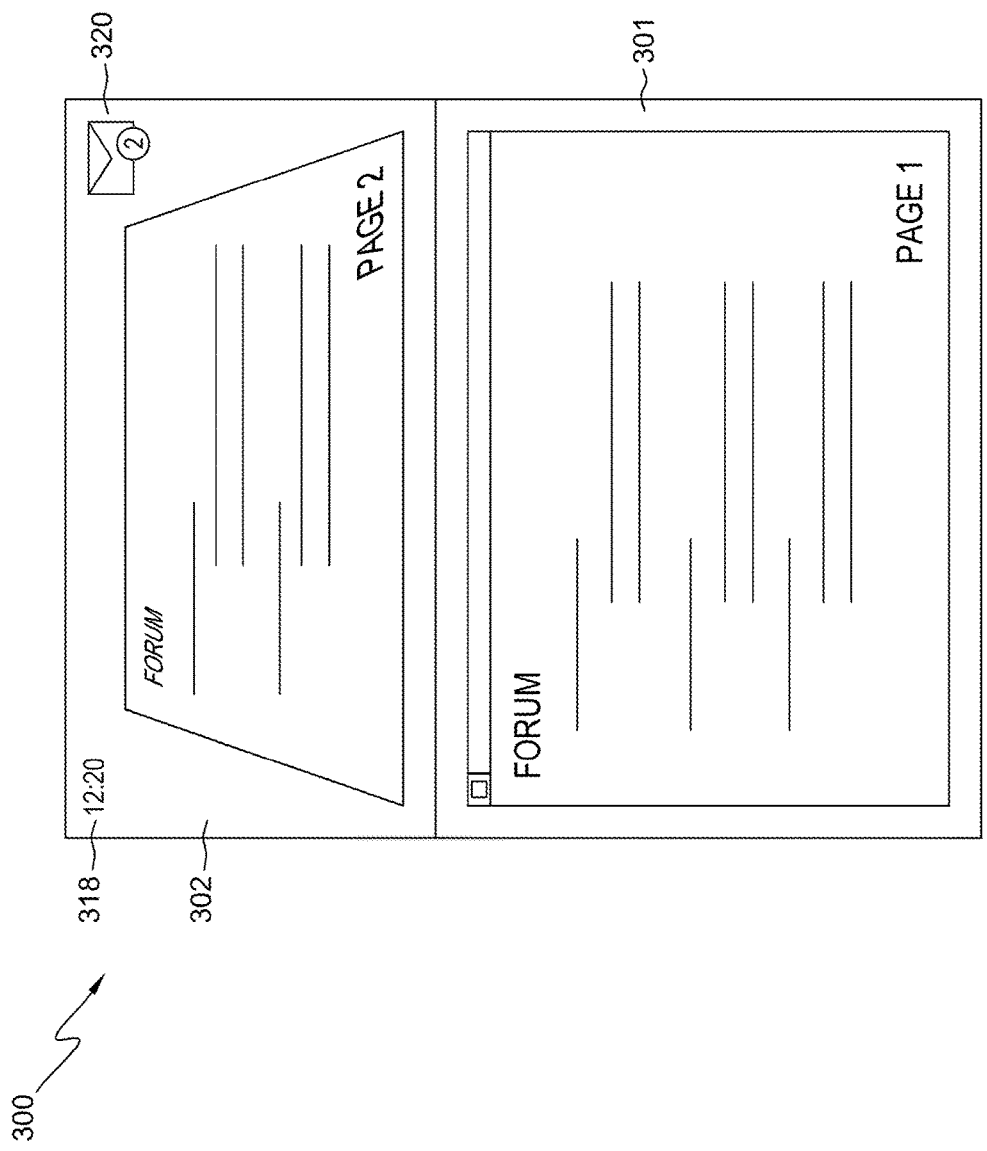
FIG. 3 depicts an example of providing an extended display on a flexible display of a computer system, the extended display providing both continuity of primary content and additional content, in accordance with aspects described herein.

FIG. 3 depicts an example of providing an extended display on a flexible display of a computer system, the extended display providing both continuity of primary content and additional content, in accordance with aspects described herein. The content initially displayed on the display 300 may be a page 1 of a web forum presented in full screen view. FIG. 3 presents the display after a user has applied flexion to the display sufficient to invoke the extended display. Primary content region 301 shows page 1 of the forum as the primary content being displayed on region 301, which in this case is the same content as was initially being displayed prior to flexing the screen. Extended content region 302 shows continuity of the primary content, i.e. page 2 of the forum. The amount of content displayed in page 1 of the forum may be comparable to the amount of content displayed in page 2 of the forum, despite page 2 being presented in a smaller physical display area. The extended content is scaled so that page 2 of the forum is presented together with additional content optionally supplemental to the primary content. In this example, the additional content is a digital clock 318 and email notification icon 320. Thus, whereas prior to invoking the extended display only page 1 of the forum 'fit' on display 300, after invoking the extended display, pages 1 and 2 as well as additional content (e.g. 318, 320) is presented. It should be understood that, just as the extended content can be anything desired, the primary content displayed on the primary content region may or may not match whatever content was initially displayed on the screen prior to invoking the extended display. In examples described herein, the primary content includes some or all of the initial content, but invocation of the extended display may present any desired content—be it related to the initial content or not—for the extended content and the primary content.

The extended display may be invoked based on a user applying a threshold level of flexion to the flexible display. The threshold level of flexion may include a defined bend line at a defined location, together with a threshold angle to which the extended content region is to be bent relative to the primary content region. Once the user flexes the display to a threshold angle along a bend line at an appropriate location, the system can automatically dynamically invoke the extended display.

In some embodiments, multiple different threshold levels of flexion may be provided for showing similar or different content. Different thresholds may differ by their associated bend angle and/or associated bend line or location thereof. As an example, bending the flexible display to a first angle of 45° may invoke a first extended display of first extended content, while bending to a second angle of 90° may invoke a second, and different, extended display of second extended content. Additionally or alternatively, the extended content displayed may be based on a location of the bend line provided, so that flexing the display nearer to the top portion of the display produces different extended content than flexing the display nearer to the bottom portion of the display.

Figure 4:
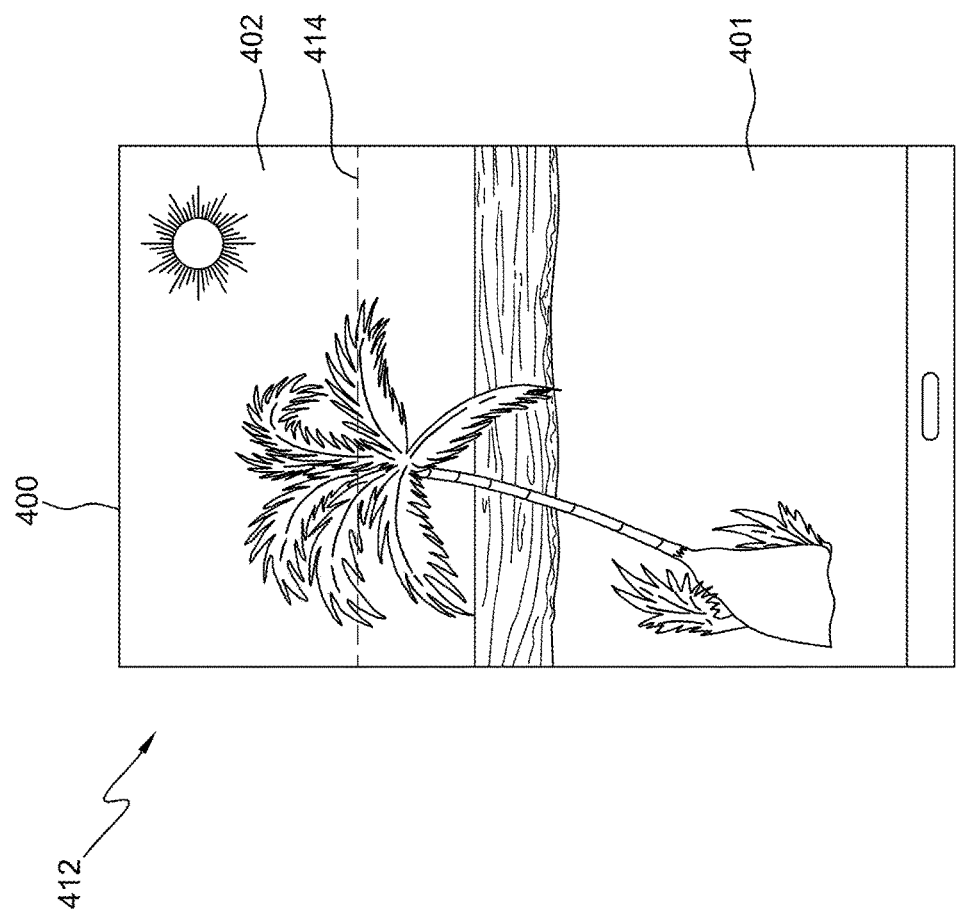
FIG. 4 depicts an example of providing a bend line location on a flexible display of a computer system for invoking an extended display thereof, in accordance with aspects described herein.

In any event, guidance may be provided to the user to assist in flexing the display to the threshold level for invoking the extended display. FIG. 4 depicts an example of providing a bend line location on a flexible display of a computer system for invoking an extended display thereof, in accordance with aspects described herein. Computer system 412 includes flexible display 400 as a component thereof. Initially, the display is in the flat or substantially flat position and displays an image of a beach scene on the entirety of the display (regions 401 and 402). The system can automatically or based on a user request/input identify a bend line location to guide the user as to a bend line suitable to satisfy the threshold level of flexion. Here, the bend line location is provided by dashed line 414 across the display to inform the user that flexing the screen along that line to the threshold bend angle will invoke the extended display. Though not shown in FIG. 4, an indication of the requisite bend angle may also be provided to the user, via one or more visual and/or audio signals as examples. When flexion is applied to the display to flex the display along the bend line to the threshold angle, the computer will invoke the extended display.

Various technologies exist for detecting an amount of flexion being applied to a flexible display. In some examples, one or more sensors detect the degree of bending applied to various points of the flexible display. The character of the flexion (angle, curvature, location, force, etc.) may all be determined and factor into the determination of whether the threshold level of flexion is satisfied. In this regard, though the figures depict well-defined creases in the flexible display, such defined creases may be not be practically achievable in some flexible displays, which instead will exhibit some degree of curvature about the bend/flex points. Consequently, the angle of a bend may be determined based on an amount and/or radius of curvature exhibited in an area about the bend line.

Figure 5:
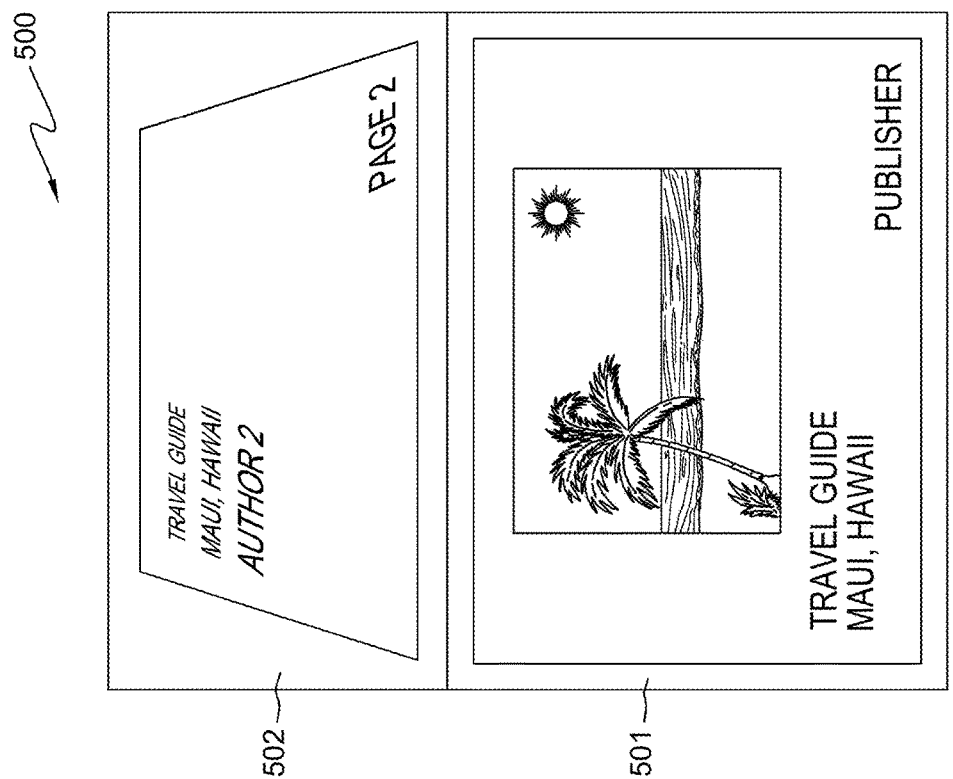
FIGS. 5 and 6 depict examples of primary content on a primary content region of a flexible display and extended content on an extended content region of the flexible display, in accordance with aspects described herein.
Figure 6:
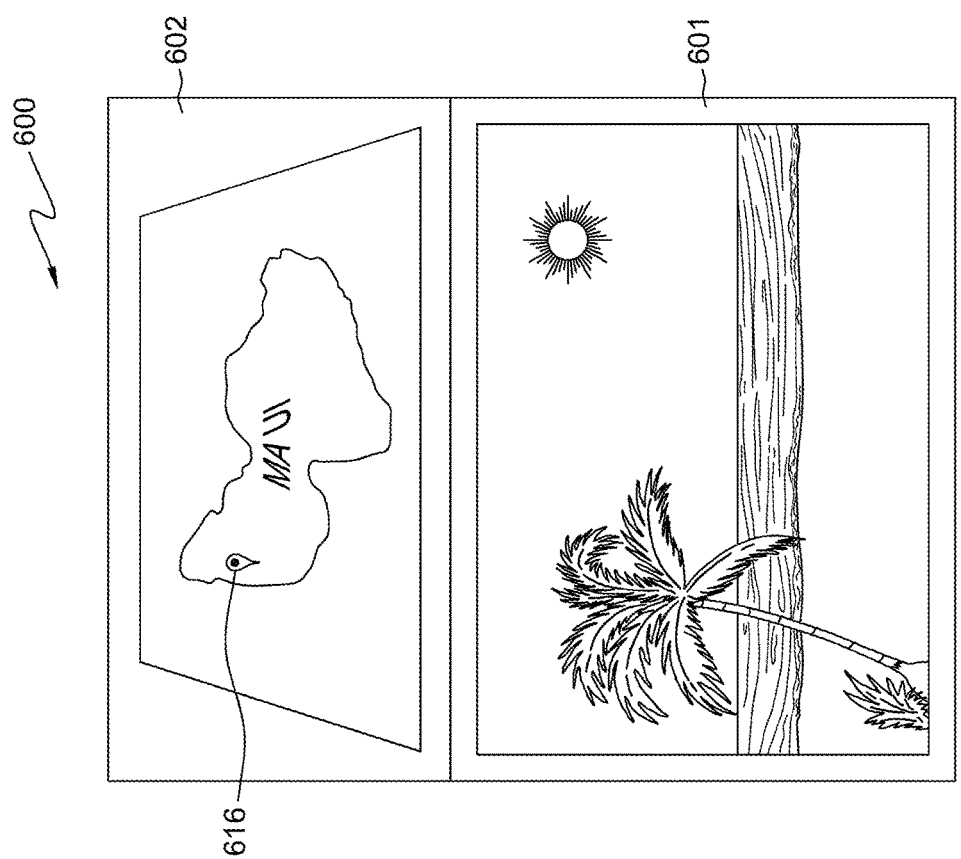

Returning to FIG. 4, the extended display is invoked based on the user flexing the flexible display along bend line 414 to satisfy the requisite bend angle. Primary content region 401 may display some or all of the content initially displayed on the device prior to the bending. Meanwhile, extended content is presented in extended content region 402. The extended content may or may not relate to the primary content displayed on primary content display 401. FIGS. 5 and 6 depict examples of primary content and extended content displayed in respective regions of a flexible display, in accordance with aspects described herein. FIG. 5 shows flexible display 500 with primary content region 501 displaying the cover of a digital travel guide for Maui, Hawaii. Extended content region 502 in this example is configured to display a next page of the digital guide, which in this example is the title page. Whereas the unflexed display 500 may display only the cover of the digital book in full screen, the extended display is invoked upon applying the threshold level of flexion to the display so that the primary content (the cover) is displayed in the primary content region and the extended content (next page) is displayed in the extended content region.

FIG. 5 provides an example of continuous content display, though other examples are possible. FIG. 6 depicts an example display 600 in which metadata of the primary content in primary content region 601 is used to build the extended content presented in the extended content region 602. The primary content is a photograph of a beach scene and the extended content shows a location 616 in Maui, Hawaii at which the picture was taken. The location information may be harvested from metadata (e.g. Exchangeable image file format "EXIF" data) of the photograph and placed against a map either included with the content or obtained from an external mapping facility.

FIG. 5 shows an example in which the extended content includes continuity of the primary content, while FIG. 6 provides supplemental content related to the primary content. Thus, the particular type of extended content may vary depending on the type of content being viewed and/or user settings or preferences. A setting of the content itself, a setting of the application the user is using the view the content, and/or a setting of the system, such as an operating system setting, can identify the particular extended content or type of extended content to display. For FIG. 5 a setting specified that extended content for pages of a digital book (or more generally any multi-page document, website, or other content) should include the page/section following the primary content. Meanwhile, as in FIG. 6, a setting can identify that when the primary content is an image/photograph, the extended content should display some/all of the metadata of the image. Further, global or content-specific settings can dictate what additional content may be added as part of the extended content. Example additional content 318, 320 of FIG. 3 may be defined in, for instance, a setting separate from the one or more settings that dictate the next page of the forum be included in the extended content.

In some examples, the system can recognize a switch between the two types on content on the primary content region. If a user viewing the digital travel guide of FIG. 5 (with page 2 displayed in the extended display) selects the photograph on the cover page and the system enlarges the selected photograph to present the image on the primary content region, the system can dynamically recognize a switch in content type of the primary content, and alter the extended display to present the extended content desired for the new content type—here the location metadata presented on a map, as shown in FIG. 6.

The system can be configured to present any desired combination of primary content/extended content. The granularity of this selection can be as fine or coarse as desired. An example of fine granularity enables a content creator or other user to specify (in metadata or elsewhere) the nature/type of extended content to show when another user invokes an extended display when viewing the content. As an example, the photographer of a panoramic picture of a beach scene may upload/share the photo with metadata specifying that the extended content should show a location at which the photograph was taken, show copyright information, or show other EXIF data, as examples. Additionally or alternatively, a user may configure within an application ("app") that displays the photograph or on the computer system generally a setting that specifies that when the primary content is a photograph, the location at which the photograph was taken, copyright information, or other EXIF data (as examples) is to be presented if available as the extended content.

Another example involves video content, where the extended display may present related content, such as text, video, audio, images, or other content related to the video in the extended display. If the primary content is a movie, for instance, a setting may specific that the extended content is to include behind-the-scenes or making-of clips, interviews with actors/directors, actor/director profiles or biography, or anything else. Such extended content may or may not be included with or as part of the primary content. When the extended content for a photograph is to include a location at which the photograph was taken, the metadata of the photograph may specify merely geographic coordinates of the location. The computer system may be responsible for automatically obtaining geographic data, such as a digital map of the location, and present the indicated coordinates on the map.

Yet another example involves content that includes an image or video that does not fit in its native aspect ratio on the display and therefore is cropped. Example primary content is a portion of the picture, while the extended content may be additional part(s) of the photograph not otherwise seen (as was presented with reference to FIGS. 2A and 2B above). Additionally, as recited previously, additional content, such as a clock 318 or email notification 320 as examples, may be controlled by separate settings as universally or selectively included with the presentation of specific or all extended content.

Accordingly, aspects described herein enable a user viewing content on a flexible display to apply flexion to the display to invoke an extended display on the flexible display. The threshold level of flexion to invoke the extended display may be defined by the user of the device and/or other users, for instance a creator or distributor of the content. In some embodiments, a user can apply a desired level of flexion to the display and store the sensed bend line and/or bend angle against the content (in metadata thereof or separate data, as examples). That stored level of flexion may define at least a portion of the threshold level to be applied to invoke the extended display. Additionally, the user can, at that time and if desired, define the type of extended content to display when a user views the content and applies the threshold level of flexion to the display. In some embodiments, this stored information is shared along with the content, for instance when the user posts the content to a social network. The information can be used by recipients of the content to provide a recommended or required bend line and/or angle, and recommended or mandatory extended content for display on the extended display.

Sensor(s) capable of detecting bending of the flexible display and installed in the display and/or computer system and can identify the level of flexion/bending being applied to the display. Based on the bending, software of the computer system can determine a bending angle and position, indicating a stress amount being applied to the flexible display. Optionally, a view or gaze point tracker, implemented by way of facilities such as one or more cameras, proximity devices, or other sensors installed in the device, can identify the user's viewing direction and may identify the extended display in the portion being bent/flexed relative to the other portion of the display. Software installed in the device can determine the dimension and direction of the extended display based, for instance, on mirror image calculation theory. Based on the viewer's eye direction and/or the dimensions of the extended content region, software can determine the direction and scaling of the extended content to construct the pixel data for presentation of the content on the flexible display. The extended display may be provided until the threshold level of flexion is no longer satisfied, in which case the screen may return to its initial state prior to invocation of the extended display.

Users can configure the content, application showing the content, and/or computer system with parameters defining not only the threshold level of flexion needed to invoke the extended display, but also the type of extended content and/or actual extended content to display for any given primary content. A given content type may have several different extended content features possible for displaying on the extended display. Additionally, a default setting may be set in the system by the user to define a default type of content to use if otherwise unspecified in the metadata of the content or application in which the content is presented.

Based on the flexion applied to the flexible display satisfying a threshold level of flexion, the extended display is invoked and the primary content and extended content are presented in their respective regions of the flexible display. If multiple threshold levels of flexion are applicable, the system will determine which, if any, threshold is met and will present the appropriate extended content. The user may then interact with the primary and extended content on the display. In this regard, the interaction with specific elements on the display may be aided by using view or gaze tracking to extrapolate the user's eye direction in conjunction with the touch point sensed on the display.

Advantageously, aspects described herein provide an extended display on a computer system and methods for invoking the extended display to present extended content to a user. Scaling can be applied to extended content to provide enhancement in the effective display dimension to enable a user to view extended/additional content and related features in a seemingly larger display space. Improvement in functioning of computing systems is provided herein. As an example, improvement in computerized user interfaces is provided herein, for instance the manner in which digital content is constructed and presented to a user on a display and viewed by the user.

Figure 7:
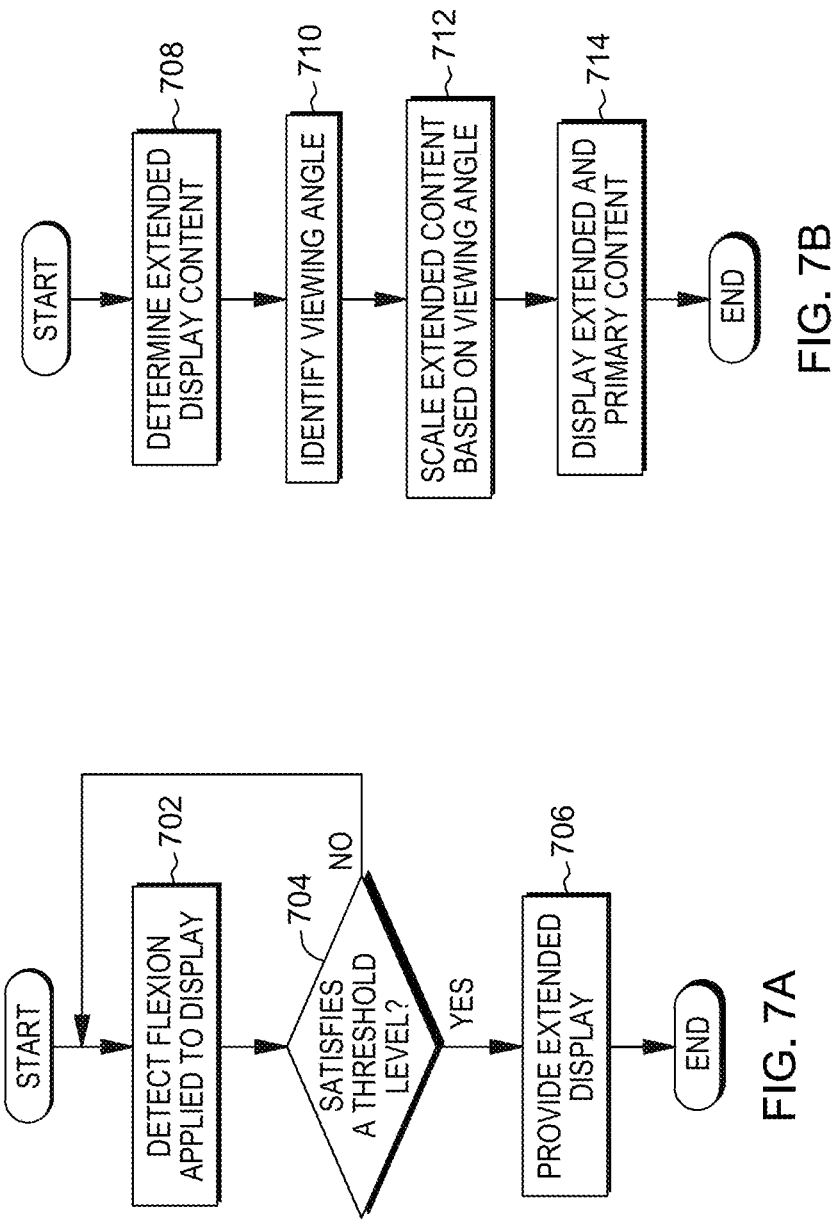
FIGS. 7A and 7B depict example processes for invoking and providing an extended display on a flexible display, in accordance with aspects described herein.

FIGS. 7A and 7B depict example processes for invoking and providing an extended display on a flexible display, in accordance with aspects described herein. Such processes may be performed by a computer system that may be the computer system having/using the flexible display, may be another computer system, such as a remote or back-end computer system performing the processing, or a combination of the two. Referring to FIG. 7A, the process begins by detecting flexion being applied to a flexible display of a computer system (702). The computer system initially displays primary content thereon. The flexion includes a bend in the flexible display along a bend line, with the bend defining primary and extended content regions of the flexible display. Based on detecting the flexion being applied, a determination is made as to whether the detected flexion satisfies a threshold level of flexion for providing an extended display on the flexible display (704). In some embodiments, detecting the flexion being applied includes determining a location of the bend line and an angle of the bend, and determining whether the detected flexion satisfies the threshold level of flexion includes determining whether the location of the bend line and the angle of the bend satisfy a bend line location and bend angle of the threshold level of flexion. Additionally or alternatively, a specification of the threshold level of flexion may be included in metadata associated with the primary content or the extended content (to be displayed), and/or the specification may be included in one or more settings of an application presenting the primary content or one or more settings of the computer system. In any case, determining whether the detected flexion satisfies the threshold level of flexion can include obtaining the specification from the metadata and/or the setting(s) as the case may be.

If at (704) it is determined that a threshold level of flexions is not satisfied, the process can return to (702). In this regard, the process may operate in a thread that loops to perform various processing, such as the detecting at (702) and determining (704).

Based on determining at (704) that the detected flexion satisfies the threshold level of flexion, the process proceeds to provide an extended display (706) on the flexible display. A specific example of providing an extended display is described below and depicted with reference to FIG. 7B. After the extended display is provided, input can be received from a user based on touch-input applied to the extended content region of the display. Such input may act on an active element of the extended content displayed on the extended content region of the flexible display. As examples, the user may be able to select hyperlinks, input text, click buttons, or interact with the extended content in any other way.

In some embodiments, the computer system identifies a bend line location suitable to satisfy the threshold level of flexion and provides an indication of the bend line location for guiding a user in invoking the extended display.

Based on providing the extended display, the process of FIG. 7A ends. It should be understood, however, that such processing may actually be performed by a thread that is configured to loop back to (702) or (704) to provide continuous monitoring for extended display invocation.

FIG. 7B depicts an example process for providing an extended display in accordance with aspects described herein. The process begins by determining the extended content to display on the extended content region (708). In some examples, the one or more settings of the computer system, one or more settings of an application presenting the primary content, and/or metadata associated with the primary content or extended content are checked in making this determination. The process then identifies a viewing angle of a user viewing the extended content region of the flexible display (710), and scales the extended content based on that viewing angle (712). This can be done to present a depth dimension to the extended content along at least one virtual plane displayed in the extended content region of the flexible display. Because of the scaling, the area of the at least one virtual plane depicted in the second region of the flexible display can exceed the physical dimensions/area of the extended content region of the flexible display.

The process then proceeds to display the scaled extended content on the extended content region of the display, and displays at least some of the primary content on the primary content region of the flexible display (714), and the process ends.

Processes described herein may be performed by one or more computer systems. In some examples, it is a mobile or other processing/computing system that the user uses and that includes or uses the flexible display that performs process(es) described herein. In other examples, a remote computer system in communication with such computer system performs process(es) described herein. As a third possibility, a combination of the (i) computer system including/using the flexible display and (ii) remote computing system(s) perform process(es) described herein.

Figure 8:
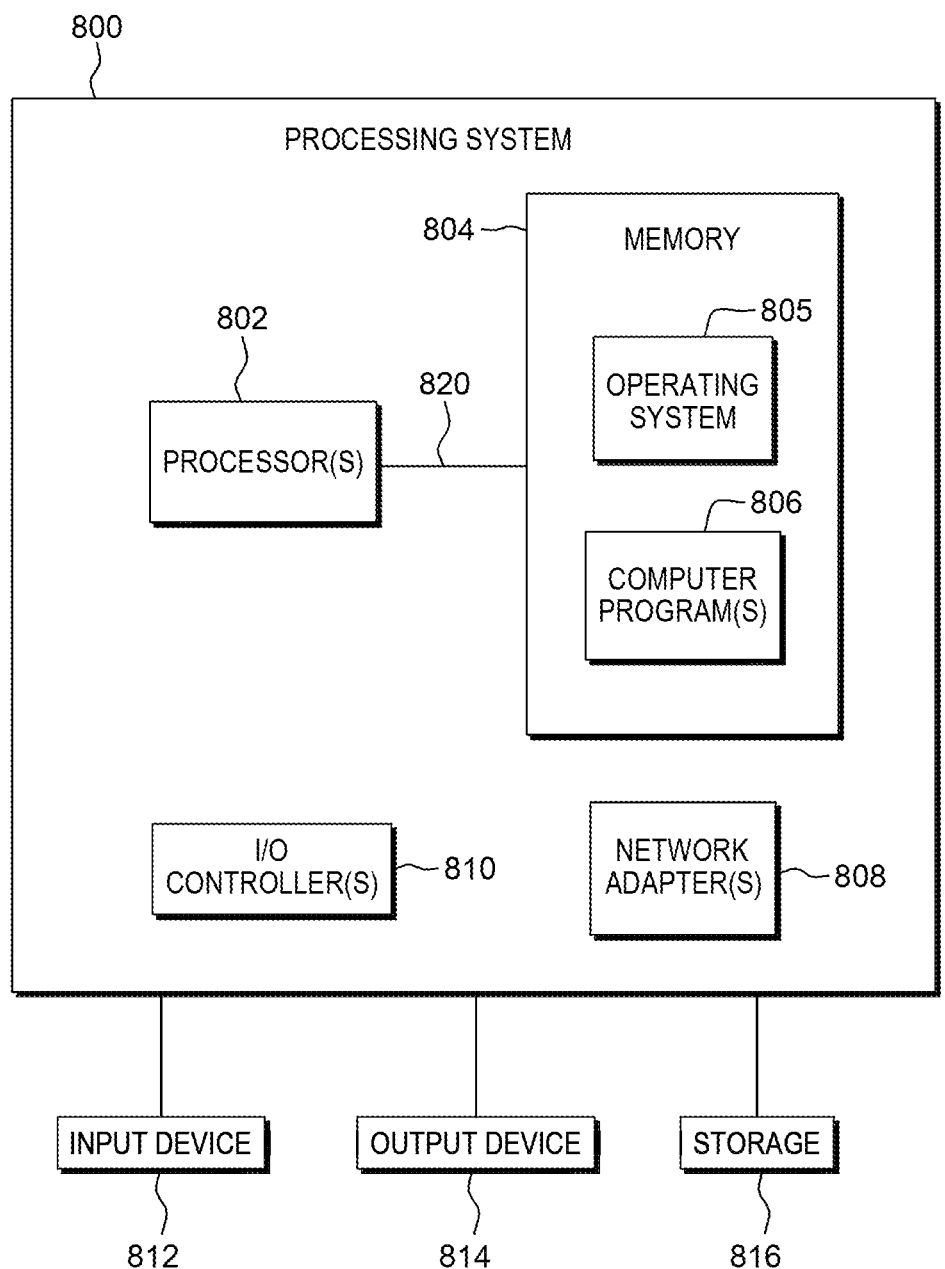
FIG. 8 depicts one example of a computer system to incorporate and use aspects described herein.

FIG. 8 depicts one example of a computer system to incorporate and use aspects described herein. A computer system may also be referred to herein as a processing device/system or computing device/system, or simply a computer. Computer system 800 may be based on various system architectures such as those offered by International Business Machines Corporation (Armonk, N.Y., USA), Intel Corporation (Santa Clara, Calif., USA), or ARM Holdings plc (Cambridge, England, United Kingdom), as examples.

Computer system 800 is suitable for storing and/or executing program code and includes at least one processor 802 coupled directly or indirectly to memory 804 through, e.g., a system bus 820. In operation, processor(s) 802 obtain from memory 804 one or more instructions for execution by the processors. Memory 804 may include local memory employed during actual execution of the program code, bulk storage, and cache memories which provide temporary storage of at least some program code in order to reduce the number of times code must be retrieved from bulk storage during program code execution. A non-limiting list of examples of memory 804 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 804 includes an operating system 805 and one or more computer programs 806, for instance programs to perform aspects described herein.

Input/Output (I/O) devices 812, 814 (including but not limited to displays, such as flexible touchscreen displays, microphones, speakers, accelerometers, gyroscopes, magnetometers, light sensors, proximity sensors, GPS devices, cameras, etc.) may be coupled to the system either directly or through I/O controllers 810.

Network adapters 808 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 808 used in computer system.

Computer system 800 may be coupled to storage 816 (e.g., a non-volatile storage area, such as magnetic disk drives, optical disk drives, a tape drive, etc.), having one or more databases. Storage 816 may include an internal storage device or an attached or network accessible storage. Computer programs in storage 816 may be loaded into memory 804 and executed by a processor 802 in a manner known in the art.

The computer system 800 may include fewer components than illustrated, additional components not illustrated herein, or some combination of the components illustrated and additional components. Computer system 800 may include any computing device known in the art, such as a mainframe, server, personal computer, workstation, laptop, handheld or mobile computer, tablet, wearable device, telephony device, network appliance, virtualization device, storage controller, etc.

Figure 9:
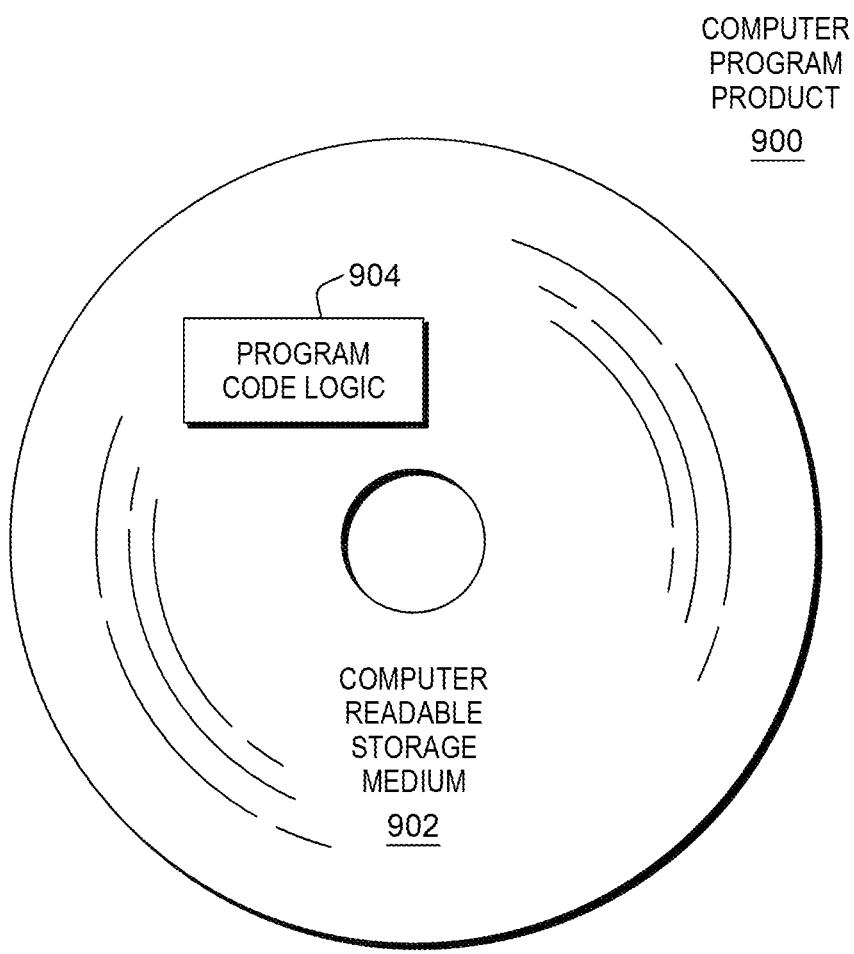
FIG. 9 depicts one embodiment of a computer program product.

Referring to FIG. 9, in one example, a computer program product 900 includes, for instance, one or more non computer readable storage media 902 to store computer readable program code means, logic and/or instructions 904 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:
    detecting flexion being applied to a flexible display of a computer system, the flexible display displaying primary content thereon, and the flexion comprising a bend in the flexible display along a bend line defining first and second regions of the flexible display;
    determining whether the detected flexion satisfies a threshold level of flexion for providing an extended display on the flexible display; and
    based on determining that the detected flexion satisfies the threshold level of flexion, providing the extended display on the flexible display, the providing comprising:
        displaying at least some of the primary content on the first region of the flexible display; and
        displaying extended content on the second region of the flexible display, the displaying the extended content comprising scaling the extended content to introduce a depth-of-field dimension to the extended content, the scaling comprising scaling extended content features that are farther from the bend line more than extended content features that are closer to the bend line, the extended display having a virtual length corresponding to the depth-of-field dimension introduced to the extended content.

2. The method of claim 1, wherein the providing the extended display further comprises determining the extended content to display on the second region of the flexible display by checking one or more settings of the computer system, one or more settings of an application presenting the primary content, or metadata associated with the primary content or extended content.

3. The method of claim 1, wherein the extended content is associated with the primary content and comprises continuity of the primary content or supplemental content about the primary content.

4. The method of claim 1, wherein the detecting flexion being applied to the flexible display comprises determining a location of the bend line and an angle of the bend, and wherein the determining whether the detected flexion satisfies the threshold level of flexion comprises determining whether the location of the bend line and the angle of the bend satisfy a bend line location and bend angle of the threshold level of flexion.

5. The method of claim 1, wherein the determining whether the detected flexion satisfies the threshold level of flexion comprises obtaining from metadata associated with the primary content or the extended content a specification of the threshold level of flexion.

6. The method of claim 1, wherein the determining whether the detected flexion satisfies the threshold level of flexion comprises obtaining from one or more settings of an application presenting the primary content or one or more settings of the computer system a specification of the threshold level of flexion.

7. The method of claim 1, wherein the providing the extended display further comprises identifying a viewing angle of a user viewing the second region of the flexible display, wherein the scaling the extended content is based on the identified viewing angle.

8. The method of claim 1, further comprising receiving input from a user of the computer system based on touch-input applied to the second region of the display displaying the extended content, wherein the input acts on an active element of the extended content displayed on the second region of the flexible display.

9. The method of claim 1, further comprising:
identifying a bend line location suitable to satisfy the threshold level of flexion; and
displaying an indication of the bend line location on the flexible display, for guiding a user in invoking the extended display.

10. A computer program product comprising:
a computer readable storage medium readable by a processor and storing instructions for execution by the processor for performing a method comprising:
detecting flexion being applied to a flexible display of a computer system, the flexible display displaying primary content thereon, and the flexion comprising a bend in the flexible display along a bend line defining first and second regions of the flexible display;
determining whether the detected flexion satisfies a threshold level of flexion for providing an extended display on the flexible display; and
based on determining that the detected flexion satisfies the threshold level of flexion, providing the extended display on the flexible display, the providing comprising:
displaying at least some of the primary content on the first region of the flexible display; and
displaying extended content on the second region of the flexible display, the displaying the extended content comprising scaling the extended content to introduce a depth-of-field dimension to the extended content, the scaling comprising scaling extended content features that are farther from the bend line more than extended content features that are closer to the bend line, the extended display having a virtual length corresponding to the depth-of-field dimension introduced to the extended content.

11. The computer program product of claim 10, wherein the extended content is associated with the primary content and comprises continuity of the primary content or supplemental content about the primary content.

12. The computer program product of claim 10, wherein the detecting flexion being applied to the flexible display comprises determining a location of the bend line and an angle of the bend, and wherein the determining whether the detected flexion satisfies the threshold level of flexion comprises determining whether the location of the bend line and the angle of the bend satisfy a bend line location and bend angle of the threshold level of flexion.

13. The computer program product of claim 10, wherein the determining whether the detected flexion satisfies the threshold level of flexion comprises obtaining a specification of the threshold level of flexion from one selected from the group consisting of: (i) metadata associated with the primary content or the extended content, (ii) one or more settings of an application presenting the primary content, and (iii) one or more settings of the computer system.

14. The computer program product of claim 10, wherein the providing the extended display further comprises identifying a viewing angle of a user viewing the second region of the flexible display, wherein the scaling the extended content is based on the identified viewing angle.

15. The computer program product of claim 10, wherein the method further comprises:
identifying a bend line location suitable to satisfy the threshold level of flexion; and
displaying an indication of the bend line location on the flexible display, for guiding a user in invoking the extended display.

16. A computer system comprising:
a memory; and
a processor in communication with the memory, wherein the computer system is configured to perform a method, the method comprising:
detecting flexion being applied to a flexible display of a computer system, the flexible display displaying primary content thereon, and the flexion comprising a bend in the flexible display along a bend line defining first and second regions of the flexible display;
determining whether the detected flexion satisfies a threshold level of flexion for providing an extended display on the flexible display; and
based on determining that the detected flexion satisfies the threshold level of flexion, providing the extended display on the flexible display, the providing comprising:
displaying at least some of the primary content on the first region of the flexible display; and
displaying extended content on the second region of the flexible display, the displaying the extended content comprising scaling the extended content to introduce a depth-of-field dimension to the extended content, the scaling comprising scaling extended content features that are farther from the bend line more than extended content features that are closer to the bend line, the extended display having a virtual length corresponding to the depth-of-field dimension introduced to the extended content.

17. The computer system of claim 16, wherein the extended content is associated with the primary content and comprises continuity of the primary content or supplemental content about the primary content.

18. The computer system of claim 16, wherein the detecting flexion being applied to the flexible display comprises determining a location of the bend line and an angle of the bend, and wherein the determining whether the detected flexion satisfies the threshold level of flexion comprises determining whether the location of the bend line and the angle of the bend satisfy a bend line location and bend angle of the threshold level of flexion.

19. The computer system of claim 16, wherein the providing the extended display further comprises identifying a viewing angle of a user viewing the second region of the flexible display, wherein the scaling the extended content is based on the identified viewing angle.

20. The computer system of claim 16, wherein the method further comprises:
   identifying a bend line location suitable to satisfy the threshold level of flexion; and
   displaying an indication of the bend line location on the flexible display, for guiding a user in invoking the extended display.

\* \* \* \* \*